United States Patent
Jiao et al.

(10) Patent No.: US 10,074,163 B2
(45) Date of Patent: Sep. 11, 2018

(54) IMAGE CORRECTION METHOD AND IMAGE CORRECTION APPARATUS

(71) Applicant: FUJITSU LIMITED, Kawasaki-shi, Kanagawa (JP)

(72) Inventors: Jile Jiao, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/334,437

(22) Filed: Oct. 26, 2016

(65) Prior Publication Data

US 2017/0116716 A1 Apr. 27, 2017

(30) Foreign Application Priority Data

Oct. 27, 2015 (CN) .......................... 2015 1 0707594

(51) Int. Cl.
*G06K 9/00* (2006.01)
*G06T 5/20* (2006.01)
*G06T 5/00* (2006.01)

(52) U.S. Cl.
CPC ............... *G06T 5/20* (2013.01); *G06T 5/009* (2013.01); *G06T 2207/30176* (2013.01)

(58) Field of Classification Search
USPC ....... 345/419, 582, 589; 348/207.1, 43, 699; 358/1.9; 382/130, 169, 173, 180; 435/317.1
See application file for complete search history.

(56) References Cited

U.S. PATENT DOCUMENTS

| | | | | |
|---|---|---|---|---|
| 6,701,009 B1* | 3/2004 | Makoto | ..................... | H04N 1/58 358/1.9 |
| 6,771,834 B1* | 8/2004 | Martins | ..................... | G06T 7/11 382/173 |
| 7,218,792 B2* | 5/2007 | Raskar | ..................... | G06T 15/02 345/582 |
| 8,155,442 B2* | 4/2012 | Ma | ........................... | G06K 9/38 382/169 |
| 8,907,972 B2* | 12/2014 | Zheng | ................. | H04N 1/40062 345/589 |
| 9,204,011 B1* | 12/2015 | Zheng | ..................... | H04N 1/409 |
| 9,256,782 B2* | 2/2016 | Pan | ..................... | G06K 9/00442 |
| 9,294,655 B2* | 3/2016 | Pan | ....................... | H04N 1/4072 |
| 9,418,307 B2* | 8/2016 | Zheng | ..................... | G06K 9/44 |
| 9,519,975 B2* | 12/2016 | Wang | ..................... | G06F 3/0425 |
| 2007/0036432 A1* | 2/2007 | Xu | ......................... | G06K 9/344 382/173 |

(Continued)

*Primary Examiner* — Xuemei Chen
(74) *Attorney, Agent, or Firm* — Staas & Halsey LLP

(57) ABSTRACT

An image correction method and an image correction apparatus when the image correction method includes: an identifying step of identifying each pixel in an image as a foreground pixel or a background pixel; a background filling step of estimating brightness of a background corresponding to a foreground pixel based on brightness and gradient of the brightness of background pixels adjacent to the foreground pixel to fill the background located in a position of the foreground pixel, to obtain a background illumination map of the image according to filled backgrounds along with background pixels; and a correcting step of correcting the image based on the brightness of each pixel in the image and the background illumination map. A non-uniform illumination image can be corrected effectively.

17 Claims, 7 Drawing Sheets

(56) References Cited

U.S. PATENT DOCUMENTS

| | | | |
|---|---|---|---|
| 2007/0263915 A1* | 11/2007 | Mashiach | G06K 9/342 382/130 |
| 2009/0081775 A1* | 3/2009 | Hodneland | G01N 15/1468 435/317.1 |
| 2009/0323089 A1* | 12/2009 | Hayasaki | H04N 1/642 358/1.9 |
| 2011/0261264 A1* | 10/2011 | Zafarifar | H04N 5/145 348/699 |
| 2012/0242789 A1* | 9/2012 | Cheng | H04N 13/0011 348/43 |
| 2013/0106848 A1* | 5/2013 | Nguyen | H04N 13/0011 345/419 |
| 2013/0301918 A1* | 11/2013 | Frenkel | G06T 7/0081 382/180 |
| 2015/0146020 A1* | 5/2015 | Imaizumi | G06K 9/22 348/207.1 |

* cited by examiner

IMAGE CORRECTION METHOD AND IMAGE CORRECTION APPARATUS

CROSS-REFERENCE TO RELATED APPLICATIONS

This application claims the priority benefit of Chinese Patent Application No. 201510707594.4, filed on Oct. 27, 2015 in the Chinese State Intellectual Property Office, the disclosure of which is incorporated herein in its entirety by reference.

BACKGROUND

1. Field

The disclosure relates to the field of image processing, and in particular to an image correction method and an image correction apparatus for correcting a non-uniform illumination image effectively.

2. Description of the Related Art

Due to portability and high resolution, a digital camera is used, replacing a scanner, as an apparatus for collecting a picture and a document on many occasions. However, an image is easy to have non-uniform illumination due to unnatural light in a shot environment. FIG. 1 is a diagram of an example of a non-uniform illumination image. The non-uniform illumination as shown in FIG. 1 may bring many difficulties to a subsequent image processing. In the conventional illumination correction method, a background is estimated as a whole by filtering or fitting, which cannot utilize the foreground information fully, and it is difficult to reflect illumination change of the background properly.

SUMMARY

Additional aspects and/or advantages will be set forth in part in the description which follows and, in part, will be apparent from the description, or may be learned by practice of the disclosure.

The following gives a brief description of the present disclosure so as to provide basic understanding of certain aspects of the present disclosure. However, it should be understood that the brief description is not an exhaustive description of the present disclosure. It neither intends to determine key or important parts of the present disclosure nor intends to limit the scope of the present disclosure. It only intends to give certain concepts of the present disclosure in a simplified manner, and serves as a preamble that precedes a more detailed description.

In view of the above problems, it is the object of the present disclosure to provide a novel and robust image correction method and image correction apparatus, which can correct a non-uniform illumination image effectively.

In an aspect of the present disclosure, an image correction method is provided, which includes: an identifying step of identifying each pixel in an image as a foreground pixel or a background pixel; a background filling step of estimating brightness of a background corresponding to a foreground pixel based on brightness and gradient of the brightness of background pixels adjacent to the foreground pixel to fill the background located in a position of the foreground pixel, so as to obtain a background illumination map of the image according to filled backgrounds along with background pixels; and a correcting step of correcting the image based on the brightness of each pixel in the image and the background illumination map.

In another aspect of the present disclosure, an image correction apparatus is further provided, which includes: an identifying unit configured to identify each pixel in an image as a foreground pixel or a background pixel; a background filling unit configured to estimate brightness of a background corresponding to a foreground pixel based on brightness and gradient of the brightness of background pixels adjacent to the foreground pixel to fill the background located in a position of the foreground pixel, so as to obtain a background illumination map of the image according to filled backgrounds along with background pixels; and a correcting unit configured to correct the image based on the brightness of each pixel in the image and the background illumination map.

In other aspects of the present disclosure, it is provided a computer program code and a computer program product for implementing the method according to the present disclosure, and computer-readable storage medium on which the above-described computer program code for implementing the method according to the present disclosure is recorded.

Other aspects of the embodiments according to the present disclosure are provided in the following specification. Specifically, a detailed description is given to disclose preferred embodiments among embodiments of the present disclosure fully, but rather than limit it.

BRIEF DESCRIPTION OF THE DRAWINGS

The present disclosure can be better understood through the following detailed description given below in conjunction with the accompanying drawings, in which same or similar reference symbols are used throughout the drawings to represent same or similar parts. The accompanying drawings, together with the detailed description below, are included in the specification and form a part of the specification, and are used for further illustrating the preferred embodiments of the present disclosure by way of examples and explaining the principle and advantages of the present disclosure. In the drawings.

DETAILED DESCRIPTION

Figure 1:
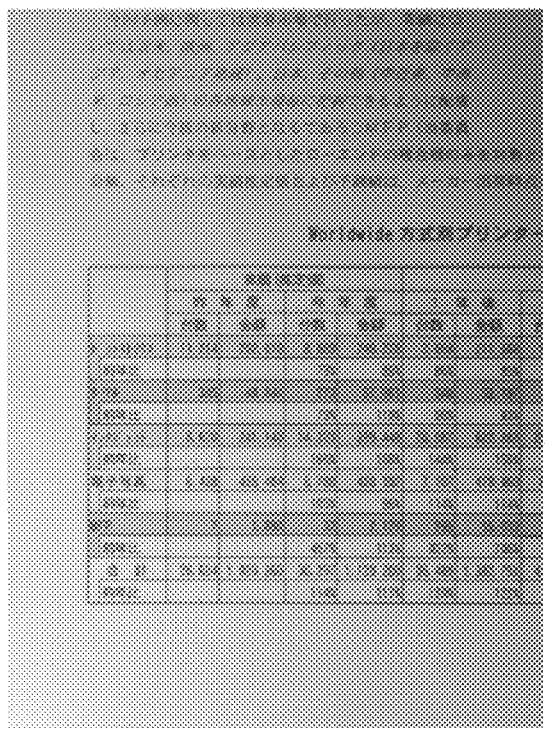
FIG. 1 is a diagram showing an example of a non-uniform illumination image.

Reference will now be made in detail to the embodiments, examples of which are illustrated in the accompanying drawings, wherein like reference numerals refer to the like elements throughout. The embodiments are described below to explain the embodiments by referring to the figures.

Hereinafter, the demonstrative embodiments of the disclosure will be described in conjunction with the drawings. For clarity and brief, not all the features of the practical embodiments are described in the specification. However, it is to be understood that, many decisions specific to the embodiment must be made during the development of any one of the practical embodiments, so as to achieve the specific object of the developer, for example, coinciding with limiting conditions related to the system and service, and possibly changing the limiting conditions with different embodiments. Moreover, it is to be understood that, although the developing work may be very complicated and time-consuming, but is only a routine task for those skilled in the art benefit from the disclosure.

It is further to be noted here that, to avoid obscuring the disclosure due to unnecessary details, only the device structure and/or processing step closely related to the solution of the disclosure are shown in the drawings, and other details less related to the disclosure are omitted.

In the following, embodiments of the present disclosure will be illustrated in detail in conjunction with the drawings.

Figure 2:
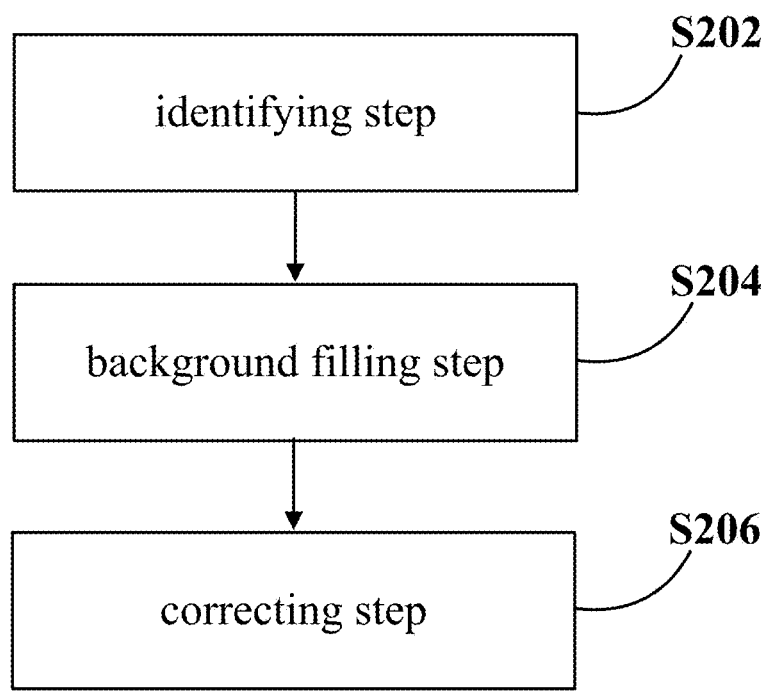
FIG. 2 is a flowchart showing a flow example of an image correction method according to an embodiment of the present disclosure.

First, referring to FIG. 2, a flow example of an image correction method according to an embodiment of the present disclosure is described. FIG. 2 is a flowchart showing the flow example of the image correction method according to an embodiment of the present disclosure.

As shown in FIG. 2, the image correction method according to an embodiment of the present disclosure may include an identifying step S202, a background filling step S204 and a correcting step S206. Next, processing in each step is described in detail respectively.

First, in the identifying step S202, each pixel in an image may be identified as a foreground pixel or a background pixel.

Preferably, in the identifying step S202, an original image may be converted into the HSV color space. H channel represents a hue of a color, S channel represents a saturation of a color, and V channel represents brightness of a color. The foreground or the background may be identified based on information on the S channel and the V channel.

Preferably, in the identifying step S202, identifying may be performed based on a gradient of the brightness and color saturation of the pixel in the image.

To separate the foreground and the background more effectively, gradient information and color saturation information may be fused to distinguish the foreground from the background. A background part of the image generally has characteristics of a slow brightness change and low color saturation. Hence, large gradient information may be used to describe an edge of the foreground, and high color saturation may be used to display content of the foreground.

Figure 3A:
FIG. 3a shows an example of a diagram of gradient of brightness of an image.
Figure 3B:
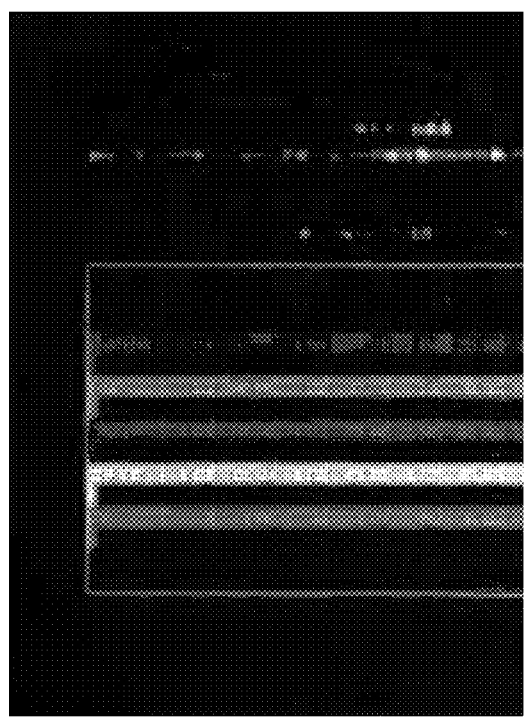
FIG. 3b shows an example of a diagram of color saturation of an image.

FIG. 3a shows an example of a diagram of gradient of brightness of an image. FIG. 3b shows an example of a diagram of color saturation of an image. Specifically, for the image shown in FIG. 1, FIG. 3a and FIG. 3b show a diagram of gradient of brightness on the V channel based on Sobel operator and a diagram of color saturation on the S channel respectively.

Preferably, a pixel is determined as a foreground pixel if the gradient of the brightness of the pixel in the image is greater than a first threshold or color saturation of the pixel in the image is greater than a second threshold.

Preferably, the first threshold or the second threshold may be determined based on experience. Those skilled in the art may consider other method for determining the first threshold or the second threshold, which is not limited in the present disclosure.

Preferably, in the identifying step S202, an expansion processing may be performed on the foreground pixel.

Figure 3C:
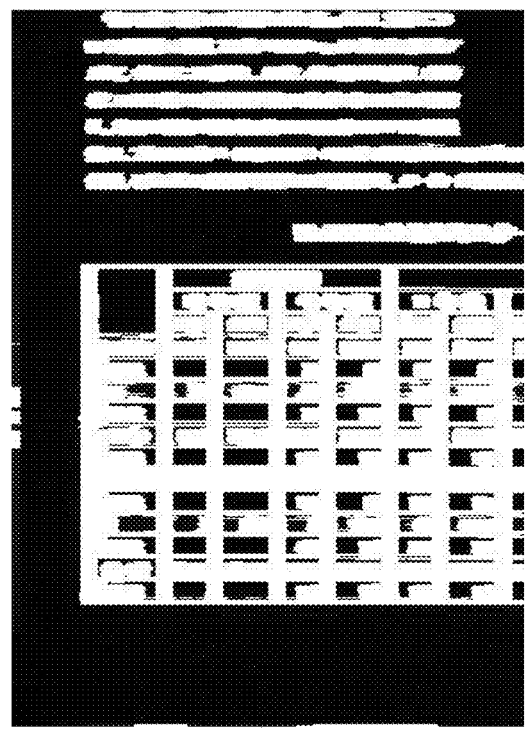
FIG. 3c is a diagram showing an example of identifying an image as a foreground and a background.

A fused result of the diagram of gradient of brightness and the diagram of color saturation shows the foreground information of the image, image binarization and expansion processing are performed, and the foreground pixel and the background pixel are separated. FIG. 3c is a diagram showing an example of identifying an image as a foreground and a background. Specifically, FIG. 3c shows the diagram of identifying the image shown in FIG. 1 as a foreground and a background. White represents the foreground pixel, and black represents the background pixel.

Preferably, the foreground and the background may be separated by using a method of inter-frame difference or based on color information or depth information, thereby identifying each pixel in the image as a foreground pixel or a background pixel.

In the background filling step S204, brightness of a background corresponding to a foreground pixel may be estimated based on brightness and gradient of the brightness of background pixels adjacent to the foreground pixel to fill the background located in a position of the foreground pixel, so as to obtain a background illumination map of the image according to filled backgrounds along with the background pixels.

In the background filling step S204, to indicate background illumination better, for the image which is obtained in the identifying step S202 and identified as the foreground pixels or the background pixels, background filling is performed on points where the foreground pixels are located, and a background illumination map is obtained according to filled backgrounds along with the background pixels.

Preferably, in the background filling step S204, the brightness of the background corresponding to the foreground pixel may be estimated by performing sub-steps of: determining background pixels with effective gradient among all the background pixels adjacent to the foreground pixel; for each one of the determined background pixels with effective gradient, calculating, based on the brightness and a gradient of the brightness of the background pixel, an estimated value of the brightness of the background corresponding to the foreground pixel; and obtaining a brightness of the background corresponding to the foreground pixel by averaging the estimated values calculated for each one of the determined background pixels, where each one of the background pixels with effective gradient may be such a pixel that in a connection direction from the foreground pixel to the pixel, pixels adjacent to the pixel are background pixels.

Preferably, in the background filling step S204, the background illumination map of the image may be obtained by an iteration process by taking the filled background as the background pixel.

Figure 4:
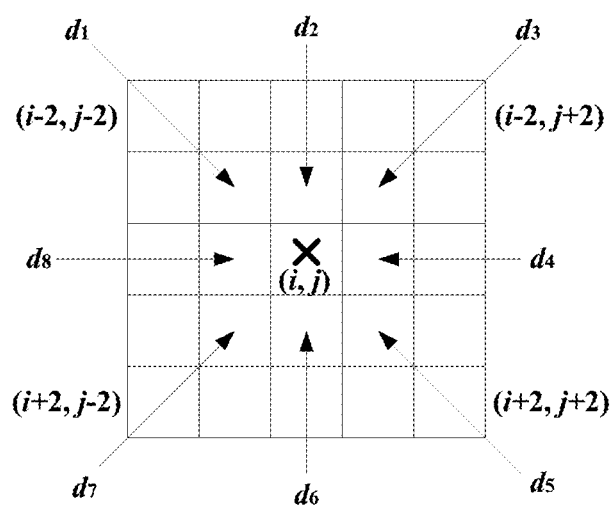
FIG. 4 is a diagram showing an example of a background filling template according to an embodiment of the present disclosure.

Preferably, the background filling may be performed based on a 5×5 template. FIG. 4 is a diagram showing an example of a background filling template according to an embodiment of the present disclosure. As shown in FIG. 4, a center of the template is a foreground pixel (for the convenience of description, this foreground pixel is abbreviated as the foreground pixel j)) with a coordinate position $(i, j)$. $d_1, d_2, \ldots d_8$ are gradients of brightness of backgrounds in directions directing to the center of the template (that is the foreground pixel $(i, j)$) from the surroundings of the template. $V(x, y)$ may indicate a brightness of a pixel at a position $(x, y)$ in the original image.

It is defined, as the background pixels with effective gradient, such a pixel that in a connection direction from the foreground pixel to the pixel, pixels adjacent to the pixel are background pixels. For example, in a case that a pixel at a position (i−1, j−1) and a pixel at a position (i−2, j−2) are both background pixels, the pixel at a position (i−1, j−1) is a background pixel with effective gradient since a pixel (i−2, j−2) adjacent to the pixel (i−1, j−1) in a connection direction from the foreground pixel (i, j) to the pixel (i−1, j−1) is a background pixel. If V(i−1, j−1) indicates a brightness of a background pixel at the position (i−1, j−1) and V(i−2, j−2) indicates a brightness of a background pixel at the position (i−2, j−2), an effective gradient between the background pixels is $d_1$=V(i−2, j−2)−V(i−1, j−1). Whereas, although the pixel at the position (i−1, j−1) is a background pixel, the pixel at the position (i−1, j−1) is not a background pixel with effective gradient if the pixel at the position (i−2, j−2) is not a background pixel, and thus $d_1$ is non-effective.

Preferably, the background pixels with effective gradient may be determined in sequence for 8 pixels adjacent to the foreground pixel. In addition, the background pixels with effective gradient may be determined for 4 pixels adjacent to the foreground pixel in directions of up, down, left and right. In addition, the background pixels with effective gradient may be determined for 4 pixels adjacent to the foreground pixel in a diagonal direction.

For the foreground pixel (i, j), it is provided that the number of background pixels with effective gradient among the background pixels adjacent to the foreground pixel is m, that is, it is provided that there are m effective gradients $d_n$ (n=$k_1$, $k_2$, ... $k_m$) around the foreground pixel.

An estimated value of the brightness of the background corresponding to the foreground pixel (i, j) may be calculated as V(i−$i_n$, j−$j_n$)−$d_n$ based on a brightness V(i−$i_n$, j−$j_n$) and a gradient $d_n$ (n=$k_1$, $k_2$, ... $k_m$) of each one of the m determined background pixels with effective gradient.

Last, a brightness V'(i, j) of a ground corresponding to the foreground pixel (i, j) may be obtained by averaging the estimated values as calculated above.

That is, a brightness V'(i, j) (that is a brightness of the ground at the position (i, j)) of a background corresponding to the foreground pixel (i, j) may be estimated according to the following formula (1):

$$V'(i, j) = \frac{\sum_{n=k_1}^{k_m} V(i - i_n, j - j_n) - d_n}{m} \quad (1)$$

An example of background filling based on a 5×5 template is described as above. The above description is merely an example rather than limitation. A template in other size may also be used to perform background filling. In addition, temples in multi-size may be used to perform background filling, such as a 5×5 template and a 8×8 template and different weighs are given to results obtained by performing background filling based on each template, and then the results are summed.

A brightness of background corresponding to other foreground pixel may be estimated by taking the filled background as the background pixel, and brightness of backgrounds corresponding to all the foreground pixels are estimated by an iteration process, that is, background filling is performed on points where all the foreground pixels are located.

Thereby, a background illumination map may be obtained according to the filled backgrounds along with the background pixels.

Figure 5:
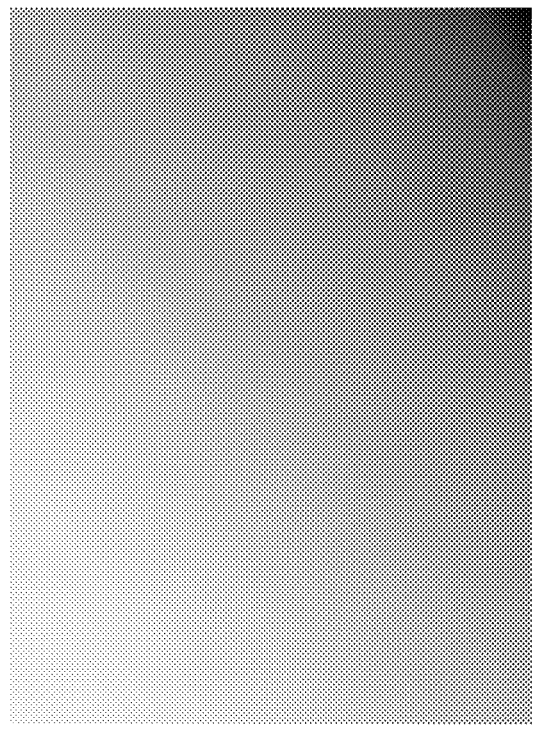
FIG. 5 is a diagram showing an example of a background illumination map according to an embodiment of the present disclosure.

Preferably, in the background filling step S204, the obtained background illumination map is smoothed. FIG. 5 is a diagram showing an example of a background illumination map according to an embodiment of the present disclosure. V'(x, y) may indicate a brightness at a position (x, y) in the background illumination map.

In the correcting step S206, the image may be corrected based on the brightness of each pixel in the image and the background illumination map.

For example, in the correcting step S206, the image may be corrected by subtracting the brightness of each pixel in the background illumination map from the bright of each pixel in the image.

In addition, to reduce effect of foreground light, the image may be corrected by further taking natural illumination intensity into consideration.

Preferably, the image correction method according to an embodiment of the present disclosure may further include a natural illumination intensity estimating step of estimating natural illumination intensity based on the brightness of all the background pixels in the image.

Preferably, in the natural illumination intensity estimating step, the natural illumination intensity may be estimated based on a mean value of the brightness of all the background pixels in the image. That is, a mean value of brightness of all the pixels of the background area obtained by separating the foreground and the background may be obtained, and thereby the natural illumination intensity $v_e$ is estimated.

Preferably, in the correcting step S206, in addition to the brightness of each pixel in the image and the background illumination map, the image may be corrected based on the natural illumination intensity.

For example, based on the brightness V(x, y) of each pixel in the original image, each V'(x, y) in the background illumination map and the natural illumination intensity $v_e$, the brightness of the corrected image may be obtained according to the following formula (2):

$$V_{out}(x,y) = V(x,y) - (x,y) + V_e \quad (2)$$

Last, the corrected image is converted from the HSV color space into the RGB color space.

Figure 6:
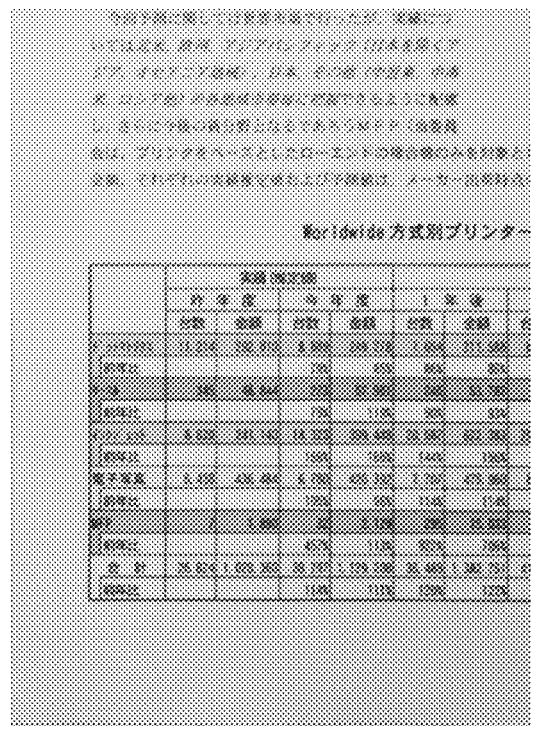
FIG. 6 is a diagram showing an example of a corrected image.

FIG. 6 is a diagram showing an example of the corrected image. Specifically, FIG. 6 shows an image obtained by correcting the image shown in FIG. 1. As shown in FIG. 6, non-uniform illumination in the image shown in FIG. 1 is eliminated in the corrected image.

It can be seen from the above description that, with the image correction method according to embodiments of the present disclosure, the foreground and the background are identified by fusing information on gradient of brightness of the image and information on color saturation of the image, and the background brightness is filled based on the information on the gradient of brightness and neighborhood information, thereby brightness correction can be performed on the non-uniform illumination image effectively.

Corresponding to the above-described method embodiment, the following apparatus embodiment is further provided in the present disclosure.

Figure 7:
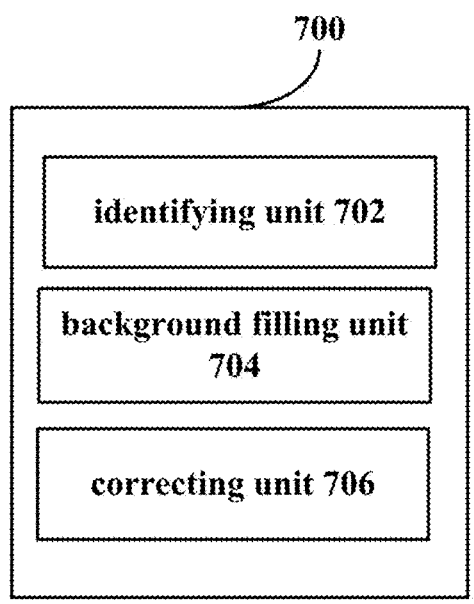
FIG. 7 is a block diagram showing a function configuration example of an image correction apparatus according to an embodiment of the present disclosure.

FIG. 7 is a block diagram showing a function configuration example of an image correction apparatus 700 according to an embodiment of the present disclosure.

As shown in FIG. 7, the image correction apparatus 700 according to an embodiment of the present disclosure may include an identifying unit 702, a background filling unit 704 and a correcting unit 706. Next, a function configuration example of each unit will be described.

The identifying unit 702 may be configured to identify each pixel in an image as a foreground pixel or a background pixel.

Preferably, in the identifying unit 702, the original image may be converted into the HSV color space. The foreground and the background may be identified based on information on S channel and V channel.

Preferably, in the identifying unit 702, the identifying may be performed based on a gradient of the brightness and color saturation of the pixel in the image.

Preferably, a pixel in the image is determined as a foreground pixel if the gradient of the brightness of the pixel is greater than a first threshold or color saturation of the pixel is greater than a second threshold.

Preferably, the first threshold or the second threshold may be determined based on experience. Those skilled in the art may consider other method for determining the first threshold or the second threshold, which is not limited in the present disclosure. Preferably, in the identifying unit 702, an expansion processing may be performed on the foreground pixel.

As for a specific method for identifying the foreground pixel and the background pixel based on the gradient of brightness and the color saturation of the pixel in the image, reference may be made to the corresponding description in the above method embodiment, which is not described here.

Preferably, the foreground and the background may be separated by using a method of inter-frame difference or based on color information or depth information, thereby identifying each pixel in the image as a foreground pixel or a background pixel.

The background filling unit 704 may be configured to estimate brightness of a background corresponding to a foreground pixel based on brightness and gradient of the brightness of background pixels adjacent to the foreground pixel to fill the background located in a position of the foreground pixel, so as to obtain a background illumination map of the image according to filled backgrounds along with the background pixels.

In the background filling unit 704, to indicate background illumination better, for the image which is obtained in the identifying unit 702 and identified as the foreground pixel or the background pixel, background filling is performed on a point where the foreground pixel is located, and a background illumination map is obtained according to filled backgrounds along with the background pixels.

Preferably, in the background filling unit 704, the brightness of the background corresponding to the foreground pixel may be estimated by: determining background pixels with effective gradient among all the background pixels adjacent to the foreground pixel; for each one of the determined background pixels with effective gradient, calculating, based on the brightness and a gradient of the brightness of the background pixel, an estimated value of the brightness of the background corresponding to the foreground pixel; and obtaining a brightness of the background corresponding to the foreground pixel by averaging the estimated values calculated for each one of the determined background pixels, where each one of the background pixels with effective gradient may be such a pixel that in a connection direction from the foreground pixel to the pixel, pixels adjacent to the pixel are background pixels.

Preferably, in the background filling unit 704, the background illumination map of the image may be obtained by an iteration process by taking the filled background as the background pixel.

As for a specific method for obtaining the background illumination map of the image, reference may be made to the corresponding description in the above method embodiment, which is not described here.

Preferably, in the background filling unit 704, the obtained background illumination map is smoothed.

The correcting unit 706 may be configured to correct the image based on the brightness of each pixel in the image and the background illumination map.

For example, in the correcting unit 706, the image may be corrected by subtracting the brightness of each pixel in the background illumination map from the bright of each pixel in the image.

In addition, to reduce effect of foreground light, the image may be corrected by further taking natural illumination intensity into consideration.

Preferably, the image correction apparatus according to an embodiment of the present disclosure may further include a natural illumination intensity estimating unit which can be configured to estimate natural illumination intensity based on the brightness of all the background pixels in the image.

Preferably, in the natural illumination intensity estimating unit, the natural illumination intensity may be estimated based on a mean value of the brightness of all the background pixels in the image. That is, a mean value of brightness of all the pixels of the background area obtained by separating the foreground and the background may be obtained, and thereby the natural illumination intensity is estimated.

Preferably, in the correcting unit 706, in addition to the brightness of each pixel in the image and the background illumination map, the image may be corrected based on the natural illumination intensity.

As for a specific method for correcting the image based on the natural illumination intensity, reference may be made to the corresponding description in the above method embodiment, which is not described here.

Last, the corrected image is converted from the HSV color space into the RGB color space.

It can be seen from the above description that, with the image correction apparatus according to embodiments of the present disclosure, the foreground and the background are identified by fusing information on gradient of brightness of the image and information on color saturation of the image, and the background brightness is filled based on the information on the gradient of brightness and neighborhood information, thereby brightness correction can be performed on the non-uniform illumination image effectively.

It should be noted that, although the function configuration of the image correction apparatus according to the embodiments of the present disclosure is described as above, this is only an example rather than limitation, and those skilled in the art can modify the above embodiments in accordance with principles of the present disclosure, for example, function modules in each embodiment can be added, deleted, or combined, and such modifications each fall within the scope of the present disclosure.

In addition, it should be noted that, the apparatus embodiment here corresponds to the above-described method embodiment. Therefore, as for the content not described in detail in the apparatus embodiment, reference may be made to the corresponding description in the method embodiment, which is not described here.

It should be understood that, machine-executable instructions in a storage medium and a program product according to the embodiments of the present disclosure may further be configured to perform the above-described image correction method. Therefore, as for the contents not described in detail here, reference may be made to the previous corresponding description, which is not described here.

Correspondingly, the storage medium used for carrying the program product including machine-readable instructions is included in the present disclosure. The storage medium includes but not limited to, a floppy diskette, an optical disk, a magneto-optical disk, a memory card, a memory stick and so on.

In addition, it should further be noted that, the above-described series of processing and apparatuses may also be implemented by software and/or firmware. In the case of software and/or firmware, program constituting the software is loaded onto the computer having a dedicated hardware structure via a storage medium or a network, such as a general purpose computer 800 shown in FIG. 8, and the computer, when installed with various programs, can execute various functions.

Figure 8:
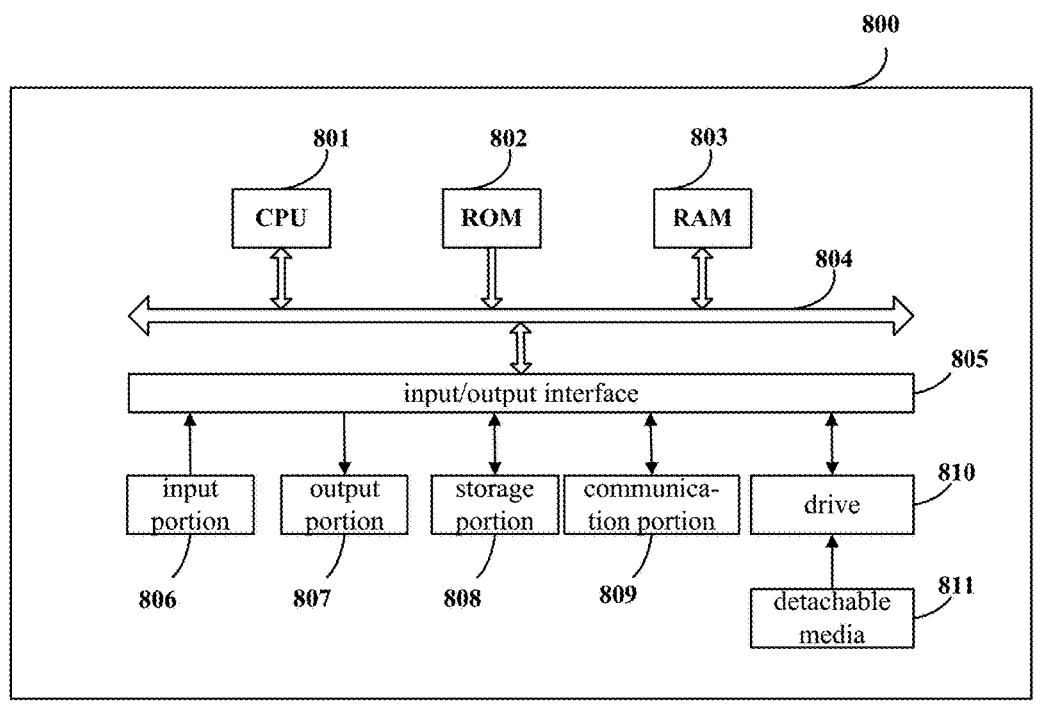
FIG. 8 is a block diagram showing an example structure of a personal computer serving as an information processing apparatus which is capable to be adopted in an embodiment of the present disclosure.

In FIG. 8, a central processing unit (CPU) 801 performs various processing according to the program stored in a read only memory (ROM) 802 or the program loaded from the storage portion 808 to a random access memory (RAM) 803. In the RAM 803, the data required by CPU 801 to execute various processing is also stored as necessary.

CPU 801, ROM 802 and RAM 803 are linked to each other via a bus 804. Input/output interface 805 is also linked to the bus 804.

The following components are linked to the input/output interface 805: an input portion 806, including a keyboard, a mouse, etc.; an output portion 807, including a display, such as a cathode ray tube (CRT), a liquid crystal display (LCD), etc., and a speaker, etc.; a storage portion 808 including a hard disk, etc.; and a communication portion 809, including a network interface card such as a LAN card, a modem, etc. The communication portion 809 performs a communication process via a network, such as the Internet.

A drive 810 may also be linked to the input/output interface 805 as needed. Detachable non-transitory media 811 such as disk, optical disk, magneto-optical disk, or a semiconductor memory, is mounted on the drive 810 as needed, such that a computer program read out therefrom is installed into the storage portion 808 as needed.

In the case of implementing the above-described series of processing by software, the program constituting the software is installed via the network such as the Internet or a storage medium such as the detachable media 811.

It should be appreciated by those skilled in the art that, such storage medium is not limited to the detachable media 811 shown in FIG. 8 in which the program is stored and distributed separately from the apparatus to provide program to the user. The examples of the detachable media 811 include the disk (including a floppy disk (registered trademark)), CD (including compact disc read-only memory (CD-ROM) and a digital versatile disk (DVD)), a magneto-optical disk (including a mini disc (MD) (registered trademark)) and a semiconductor memory. Alternatively, the storage medium may be a ROM 802, a hard disk contained in the storage portion 808 and so on, in which the program is stored, and is distributed to a user together with the apparatus containing them.

The preferred embodiments of the present disclosure have been described above in detail with reference to the accompanying drawings, whilst the present disclosure is not limited to the above examples, of course. A person skilled in the art may find various changes and modifications within the scope of the appended claims, and it should be understood that they will naturally come under the technical scope of the present disclosure.

For example, multiple functions included in one unit in the above embodiments may be implemented by separate apparatus. Alternatively, multiple functions implemented by multiple units in the above embodiments may be separately implemented by separate apparatus. In addition, one of the above functions may be implemented by multiple units. Needless to say, such a configuration is included in the technical scope of the present disclosure.

In this specification, the steps described in the flowchart include not only processing performed in the order in time series, but also include processing parallel or individually and not necessarily performed in time series. Moreover, even in the step of processing in time series, needless to say, it can be appropriately changed in that order.

In addition, the technique according to the present disclosure may further be configured as follows.

Remark 1. An image correction method is provided, comprising:
an identifying step of identifying each pixel in an image as a foreground pixel or a background pixel;
a background filling step of estimating brightness of a background corresponding to a foreground pixel based on brightness and gradient of the brightness of background pixels adjacent to the foreground pixel to fill the background located in a position of the foreground pixel, so as to obtain a background illumination map of the image according to filled backgrounds along with background pixels; and
a correcting step of correcting the image based on the brightness of each pixel in the image and the background illumination map.

Remark 2. The image correction method according to remark 1, wherein in the identifying step, the identifying is performed based on a gradient of the brightness and color saturation of the pixel in the image.

Remark 3. The image correction method according to remark 1, wherein in the background filling step, the brightness of the background corresponding to the foreground pixel is estimated by performing sub-steps of:
determining background pixels with effective gradient among all the background pixels adjacent to the foreground pixel;
for each one of the determined background pixels with effective gradient, calculating, based on the brightness and a gradient of the brightness of the background pixel, an estimated value of the brightness of the background corresponding to the foreground pixel; and
obtaining a brightness of the background corresponding to the foreground pixel by averaging the estimated values calculated for each one of the determined background pixels,
wherein each one of the background pixels with effective gradient is such a pixel that in a connection direction from the foreground pixel to the pixel, pixels adjacent to the pixel are background pixels.

Remark 4. The image correction method according to remark 1, further comprising a natural illumination intensity estimating step of estimating natural illumination intensity based on the brightness of all the background pixels in the image.

Remark 5. The image correction method according to remark 4, wherein in the natural illumination intensity estimating step, the natural illumination intensity is estimated based on a mean value of the brightness of all the background pixels in the image.

Remark 6. The image correction method according to remark 4 or 5, wherein in the correcting step, in addition to the brightness of each pixel in the image and the background illumination map, the image is corrected based on the natural illumination intensity.

Remark 7. The image correction method according to remark 1, wherein in the identifying step, an expansion processing is performed on the foreground pixel.

Remark 8. The image correction method according to remark 1, wherein in the background filling step, the background illumination map of the image is obtained by an iteration process by taking the filled background as the background pixel.

Remark 9. The image correction method according to remark 1, wherein in the background filling step, the obtained background illumination map is smoothed.

Remark 10. An image correction apparatus, comprising:
an identifying unit configured to identify each pixel in an image as a foreground pixel or a background pixel;
a background filling unit configured to estimate brightness of a background corresponding to a foreground pixel based on brightness and gradient of the brightness of background pixels adjacent to the foreground pixel to fill the background located in a position of the foreground pixel, so as to obtain a background illumination map of the image according to filled backgrounds along with background pixels; and
a correcting unit configured to correct the image based on the brightness of each pixel in the image and the background illumination map.

Remark 11. The image correction apparatus according to remark 10, wherein in the identifying unit, the identifying is performed based on a gradient of the brightness and color saturation of the pixel in the image.

Remark 12. The image correction apparatus according to remark 10, wherein in the background filling unit, the brightness of the background corresponding to the foreground pixel is estimated by:
determining background pixels with effective gradient among all the background pixels adjacent to the foreground pixel;
for each one of the determined background pixels with effective gradient, calculating, based on the brightness and a gradient of the brightness of the background pixel, an estimated value of the brightness of the background corresponding to the foreground pixel; and
obtaining a brightness of the background corresponding to the foreground pixel by averaging the estimated values calculated for each one of the determined background pixels,
wherein each one of the background pixels with effective gradient is such a pixel that in a connection direction from the foreground pixel to the pixel, pixels adjacent to the pixel are background pixels.

Remark 13. The image correction apparatus according to remark 10, further comprising a natural illumination intensity estimating unit configured to estimate natural illumination intensity based on the brightness of all the background pixels in the image.

Remark 14. The image correction apparatus according to remark 13, wherein in the natural illumination intensity estimating unit, the natural illumination intensity is estimated based on a mean value of the brightness of all the background pixels in the image.

Remark 15. The image correction apparatus according to remark 13 or 14, wherein in the correcting unit, in addition to the brightness of each pixel in the image and the background illumination map, the image is corrected based on the natural illumination intensity.

Remark 16. The image correction apparatus according to remark 10, wherein in the identifying unit, an expansion processing is performed on the foreground pixel.

Remark 17. The image correction apparatus according to remark 10, wherein in the background filling unit, the background illumination map of the image is obtained by an iteration process by taking the filled background as the background pixel.

Remark 18. The image correction apparatus according to remark 10, wherein in the background filling unit, the obtained background illumination map is smoothed.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An image correction method, comprising:
identifying each pixel in an image as one of a foreground pixel and a background pixel;
estimating a brightness of a background corresponding to a foreground pixel based on the brightness and a gradient of the brightness of background pixels adjacent to the foreground pixel to fill the background located in a position of the foreground pixel to obtain a background illumination map of the image according to filled backgrounds along with background pixels; and
correcting the image based on the brightness of each pixel in the image and the background illumination map,
wherein the estimating the brightness of the background corresponding to the foreground pixel includes,
determining background pixels with an effective gradient among the background pixels adjacent to the foreground pixel;
for each one of the determined background pixels with the effective gradient, calculating, based on the brightness and the gradient of the brightness of the background pixel, an estimated value of the brightness of the background corresponding to the foreground pixel; and
obtaining the brightness of the background corresponding to the foreground pixel by averaging estimated values calculated for each one of the determined background pixels,
wherein each one of the background pixels with the effective gradient is a pixel in a connection direction from the foreground pixel to the pixel, pixels adjacent to the pixel are background pixels.

2. The image correction method according to claim 1, wherein the identifying is performed based on the gradient of the brightness and color saturation of the pixel in the image.

3. The image correction method according to claim 1, further comprising estimating a natural illumination intensity based on the brightness of the background pixels in the image.

4. The image correction method according to claim 3, wherein the natural illumination intensity is estimated based on a mean value of the brightness of the background pixels in the image.

5. The image correction method according to claim 3, wherein in the correcting, in addition to the brightness of each pixel in the image and the background illumination map, the image is corrected based on the natural illumination intensity.

6. The image correction method according to claim 1, wherein in the identifying, expansion processing is performed on the foreground pixel.

7. The image correction method according to claim 1, wherein in the estimating the brightness of the background, the background illumination map of the image is obtained by an iteration process by taking the filled background as the background pixel.

8. The image correction method according to claim 1, wherein in the estimating the brightness of the background, the obtained background illumination map is smoothed.

9. An image correction apparatus, comprising:
a processor configured to:
identify each pixel in an image as one of a foreground pixel and a background pixel;
estimate a brightness of a background corresponding to a foreground pixel based on the brightness and a gradient of the brightness of background pixels adjacent to the foreground pixel to fill the background located in a position of the foreground pixel to obtain a background illumination map of the image according to filled backgrounds along with background pixels; and
correct the image based on the brightness of each pixel in the image and the background illumination map,
wherein the brightness of the background corresponding to the foreground pixel is estimated by:
determining background pixels with an effective gradient among the background pixels adjacent to the foreground pixel;
for each one of the determined background pixels with the effective gradient, calculating, based on the brightness and the gradient of the brightness of the background pixel, an estimated value of the brightness of the background corresponding to the foreground pixel; and
obtaining the brightness of the background corresponding to the foreground pixel by averaging estimated values calculated for each one of the determined background pixels,
wherein each one of the background pixels with the effective gradient is a pixel in a connection direction from the foreground pixel to the pixel, pixels adjacent to the pixel are background pixels.

10. The image correction apparatus according to claim 9, wherein the identifying is performed based on the gradient of the brightness and color saturation of the pixel in the image.

11. The image correction apparatus according to claim 9, wherein the processor further configured to estimate a natural illumination intensity based on the brightness of the background pixels in the image.

12. The image correction apparatus according to claim 11, wherein the natural illumination intensity is estimated based on a mean value of the brightness of the background pixels in the image.

13. The image correction apparatus according to claim 11, wherein in addition to the brightness of each pixel in the image and the background illumination map, the image is corrected based on the natural illumination intensity.

14. The image correction apparatus according to claim 9, wherein an expansion processing is performed on the foreground pixel.

15. The image correction apparatus according to claim 9, wherein the background illumination map of the image is obtained by an iteration process by taking the filled background as the background pixel.

16. The image correction apparatus according to claim 9, wherein the obtained background illumination map is smoothed.

17. A non-transitory computer readable storage medium having recorded thereon a program, which when executed by a computer, causes the computer to execute a method, the method comprising:
identifying each pixel in an image as one of a foreground pixel and a background pixel;
estimating a brightness of a background corresponding to a foreground pixel based on the brightness and a gradient of the brightness of background pixels adjacent to the foreground pixel to fill the background located in a position of the foreground pixel to obtain a background illumination map of the image according to filled backgrounds along with background pixels; and
correcting the image based on the brightness of each pixel in the image and the background illumination map,
wherein the estimating the brightness of the background corresponding to the foreground pixel includes,
determining background pixels with an effective gradient among the background pixels adjacent to the foreground pixel;
for each one of the determined background pixels with the effective gradient, calculating, based on the brightness and the gradient of the brightness of the background pixel, an estimated value of the brightness of the background corresponding to the foreground pixel; and
obtaining the brightness of the background corresponding to the foreground pixel by averaging estimated values calculated for each one of the determined background pixels,
wherein each one of the background pixels with the effective gradient is a pixel in a connection direction from the foreground pixel to the pixel, pixels adjacent to the pixel are background pixels.

* * * * *